(12) United States Patent
Ye

(10) Patent No.: US 12,216,496 B2
(45) Date of Patent: Feb. 4, 2025

(54) BOOK STYLE FOLDABLE TABLET WITH STAND

(71) Applicant: Microsoft Technology Licensing, LLC, Redmond, WA (US)

(72) Inventor: Xinkui Ye, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 17/778,675

(22) PCT Filed: Nov. 19, 2020

(86) PCT No.: PCT/US2020/061369
§ 371 (c)(1),
(2) Date: May 20, 2022

(87) PCT Pub. No.: WO2021/102192
PCT Pub. Date: May 27, 2021

(65) Prior Publication Data
US 2022/0413552 A1    Dec. 29, 2022

(30) Foreign Application Priority Data

Nov. 20, 2019   (NL) ..................................... 2024268

(51) Int. Cl.
*G06F 1/16*       (2006.01)
(52) U.S. Cl.
CPC .......... *G06F 1/1641* (2013.01); *G06F 1/1632* (2013.01); *G06F 1/1681* (2013.01)
(58) Field of Classification Search
CPC ...... G06F 1/1641; G06F 1/1681; G06F 1/166; G06F 1/1679
See application file for complete search history.

(56) References Cited

U.S. PATENT DOCUMENTS

| 6,975,308 B1 | 12/2005 | Bitetto et al. |
| 7,548,220 B2 | 6/2009 | Silverbrook |
| 10,664,012 B1 * | 5/2020 | Zimmerman ......... G06F 1/1632 |

(Continued)

FOREIGN PATENT DOCUMENTS

| CN | 202218286 U | 5/2012 |
| CN | 203278907 U | 11/2013 |
| WO | 2019017877 A1 | 1/2019 |

OTHER PUBLICATIONS

Allan, Darren, "Microsoft Surface Centaurus could be a Revolutionary Dual-Screen Tablet", Retrieved from: https://www.techradar.com/news/microsoft-surface-centaurus-could-be-a-revolutionary-dual-screen-tablet, Dec. 4, 2018, 11 Pages.

(Continued)

*Primary Examiner* — Anthony Q Edwards
(74) *Attorney, Agent, or Firm* — RAY QUINNEY & NEBEKER P.C.; Paul N. Taylor

(57) ABSTRACT

In some embodiments, an electronic device includes a first portion, a second portion, a spine, and a support. The second portion is portion movably connected to the first portion by a hinge. The hinge has a hinge axis, and the spine is connected to the hinge and oriented parallel to the hinge axis. The support is connected to the spine and has a deployed position and a stowed position. The stowed position is abutting the spine and the deployed position is spaced apart from the spine to support the electronic device on a surface.

18 Claims, 10 Drawing Sheets

(56) References Cited

U.S. PATENT DOCUMENTS

| | | | |
|---|---|---|---|
| 2003/0213886 A1* | 11/2003 | Gilbert | F16M 11/10 |
| | | | 248/454 |
| 2010/0259876 A1 | 10/2010 | Kim et al. | |
| 2010/0309617 A1 | 12/2010 | Wang et al. | |
| 2011/0049860 A1 | 3/2011 | Suh | |
| 2012/0188693 A1 | 7/2012 | Chiang et al. | |
| 2014/0129739 A1 | 5/2014 | King | |
| 2014/0255899 A1 | 9/2014 | Poullain | |
| 2015/0233162 A1 | 8/2015 | Lee et al. | |
| 2015/0349830 A1* | 12/2015 | Lai | F16M 13/022 |
| | | | 455/575.4 |
| 2015/0366090 A1 | 12/2015 | You | |
| 2015/0375894 A1 | 12/2015 | Idehara et al. | |
| 2017/0222456 A1 | 8/2017 | Perez et al. | |
| 2017/0269638 A1 | 9/2017 | Chen et al. | |
| 2018/0129253 A1* | 5/2018 | Siddiqui | F16M 11/10 |
| 2018/0210504 A1* | 7/2018 | Moser | G06F 1/1679 |
| 2019/0186683 A1* | 6/2019 | Lo | E05D 11/00 |

OTHER PUBLICATIONS

Chacksfield, et al., "Huawei Mate X Hands-On: First Impressions, Specs and More", Retrieved from: https://www.tomsguide.com/us/huawei-mate-x,review-6211.html?_ga=2.49495078.1219734922.1565251214-369211185.1565251210, Oct. 24, 2019, 16 Pages.

Kyle, Wiggers, "Samsung Announces The Galaxy Fold, A Phone that Opens into a Tablet", Retrieved from: https://venturebeat.com/2019/02/20/samsung-announces-the-galaxy-fold-a-phone-that-opens-into-a-tablet/, Feb. 20, 2019, 9 Pages.

"Search Report and Written Opinion Issued in Netherland Patent Application No. N2024268", Mailed Date: Aug. 25, 2020, 17 Pages.

"International Search Report and the Written Opinion Issued in PCT Application No. PCT/US20/061369", Mailed Date: Feb. 11, 2021, 18 Pages.

Torres, JC, "Samsung Galaxy Fold vs. Huawei Mate X: Battle of the Fold", Retrieved from: https://www.slashgear.com/samsung-galaxy-fold-vs-huawei-mate-x-battle-of-the-fold-26567454, Feb. 26, 2019, 12 Pages.

Office Action Received for Chinese Application No. 202080080944.8, mailed on Jan. 26, 2024, 10 pages (English Translation Provided).

Decision on Rejection Received for Chinese Application No. 202080080944.8, mailed on Aug. 5, 2024, 07 pages (English Translation Provided).

Second Office Action Received for Chinese Application No. 202080080944.8, mailed on May 30, 2024, 07 pages (English Translation Provided).

* cited by examiner

BOOK STYLE FOLDABLE TABLET WITH STAND

BACKGROUND

Background and Relevant Art

Wireless electronic devices provide users improved levels of freedom while remaining connected to personal and professional communications. Conventional folding laptop devices support a display with a base portion containing a keyboard. The form factor requires a base to support the display and limits the options for positions and postures of an electronic device.

BRIEF SUMMARY

In some embodiments, a book-style electronic device has a first portion and a second portion that are hinged therebetween to open and close similar to a conventional book. The first portion and second portion have displays thereon, that, when the electronic device is in an open position, display visual information to a user. When in the open position, a user may desire to view or interact with the electronic device while the electronic device is positioned on a table, desk, or other surface without the user needing to support the electronic device themselves. A deployable support is integrated into a spine or hinge of the electronic device such that, when deployed, the support holds the electronic device in one or more positions for comfortable viewing. The deployable support has a stowed position that minimizes interference of the support during handheld usage of the electronic device.

In some embodiments, an electronic device includes a first portion, a second portion, a spine, and a support. The second portion is movably connected to the first portion by a hinge. The hinge has a hinge axis, and the spine is connected to the hinge and oriented parallel to the hinge axis. The support is connected to the spine and has a deployed position and a stowed position. The stowed position is abutting the spine and the deployed position is spaced apart from the spine to support the electronic device on a surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 9-1 is a rear perspective view of the electronic device of FIG. 8, according to some embodiments of the present disclosure;

FIG. 9-2 is a side view of the electronic device of FIG. 9-1 with a first support deployed, according to some embodiments of the present disclosure; and FIG. 9-3 is a side view of the electronic device of FIG. 9-1 with a second support deployed, according to some embodiments of the present disclosure.

DETAILED DESCRIPTION

The present disclosure relates generally to systems and methods for supporting an electronic device. More particularly, the present disclosure relates to supporting a foldable electronic device in a plurality of postures and on a variety of surfaces. In some embodiments, the foldable device has a closed position and an open position. In conventional laptop devices, the display is supported in the open posture by the base portion of the laptop device. In a book-style foldable electronic device, both portions of the electronic device may contain a display. The book-style foldable device can be oriented in a laptop posture in the open position and the first portion is supported by the second portion. However, in a book posture, with the hinge between the first portion and second portion and oriented vertically, both the first portion and second portion are oriented vertically, and neither are able to function as a base portion.

In some embodiments, a foldable electronic device according to the present disclosure has an open position and a closed position. A first portion and a second portion of the electronic device are movable relative to one another around a hinge. In some embodiments, the hinge is a single-axis hinge. In other embodiments, the hinge is a multiple-axis hinge. For example, the hinge may have two or more parallel axes that each allow rotation of the first portion relative to the second portion.

The rotation of the first axis and the second axis may be independent of one another. In some examples, the rotation of the first axis and the second axis may be related. In some embodiments, the first axis and second axis rotate at the same rate, such that each axis is oriented at an equal angular position at point in the range of motion of the hinge. In some embodiments, the first axis and second axis rotate with determinate motion, allowing only one axis to move at a time.

In the closed position, and outer surface of the first portion and an outer surface of the second portion are oriented in opposite directions and form the outer surface of the electronic device. a, the hinge connects the first portion and second portion and forms a spine, similar to the spine or binding of a conventional book, that runs a length of the electronic device. In some embodiments according to the present disclosure, a book-style electronic device has a deployable support in the spine.

Figure 1:
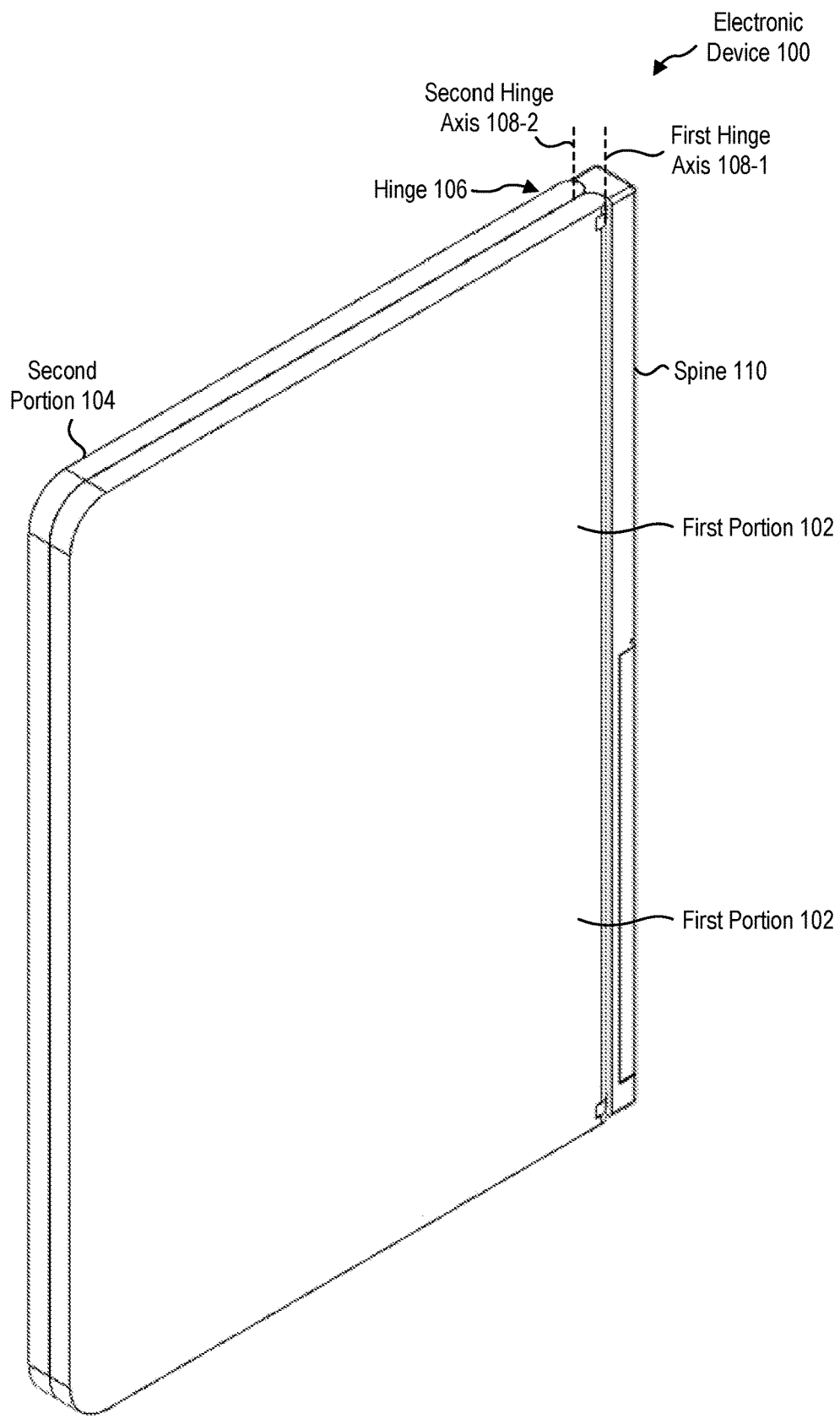
FIG. 1 is a perspective view of an electronic device in a closed position, according to some embodiments of the present disclosure.

FIG. 1 is a perspective view of an electronic device 100, according to at least some embodiments of the present disclosure. The electronic device 100 has a first portion 102 and a second portion 104 that are movable relative to one another by a hinge 106. In some embodiments, the hinge 106 has a first hinge axis 108-1 and a second hinge axis 108-2 that each allow rotation of the first portion 102 and second portion 104 relative to a spine 110, respectively. In some embodiments, the spine 110 is oriented parallel to the hinge axes 108-1, 108-2. In some embodiments, the spine 110 includes a deployable support 112 integrated therein.

In some embodiments, the electronic device has a first display on an inner surface of the first portion and a second display on an inner surface of the second portion. In some embodiments, the electronic device in the open position orients the first portion and the second portion at 180° relative to one another and positions the first display and the second display co-planar to one another. In this position, the first display and second display may be in data communication (e.g., through a processor and/or graphics module) that allows the first display and second display to present visual information to a user as if the first display and second display are a single, unified display area.

Figure 2:
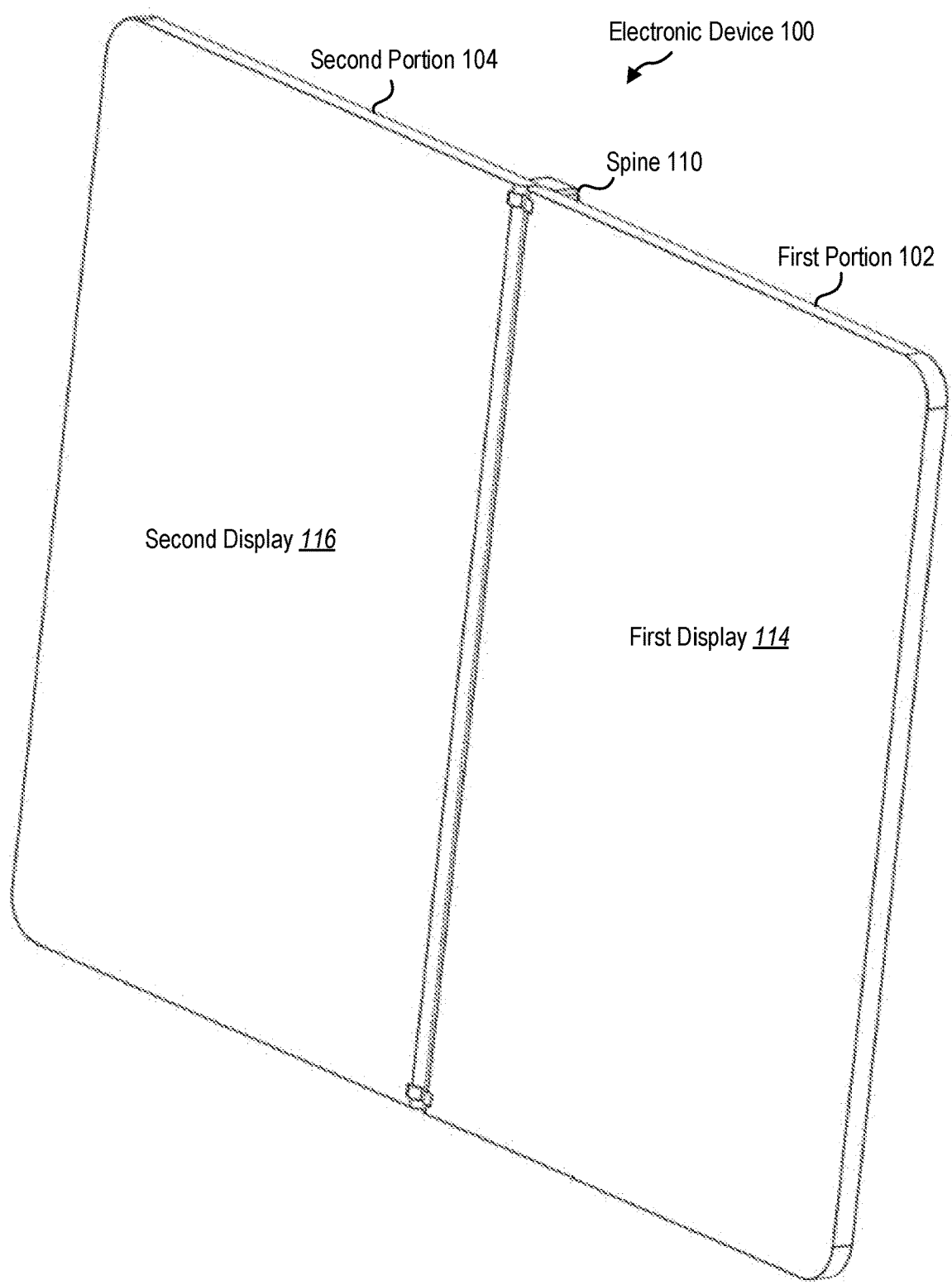
FIG. 2 is a perspective view of the electronic device of FIG. 1 in an open position, according to some embodiments of the present disclosure.

FIG. 2 is a perspective view of the electronic device 100 of FIG. 1, according to at least some embodiments of the present disclosure. The electronic device 100 has a first display 114 on the inner surface of the first portion 102 and a second display 116 on the inner surface of the second portion 104. In some embodiments, the first display 114 and second display 116 present visual information to a user. A support integrated into the spine 110 of the electronic device 100 enhances the mobility and convenience of the electronic device 100 by allowing a user to view and interact with the electronic device 100 without need for accessories or additional devices to hold the electronic device 100.

As a user may desire to view the visual information or interact with the visual information with the display upright, in some embodiments, a support is provided in the spine and/or hinge to support the electronic device substantially vertically upright and/or at an angle from upright similar to the display of a conventional laptop computer display. In some embodiments, the support holds the electronic device with the displays oriented at an angle greater than 30° from horizontal, greater than 45° from horizontal, greater than 60° from horizontal, or greater than 75° from horizontal.

Figure 3:
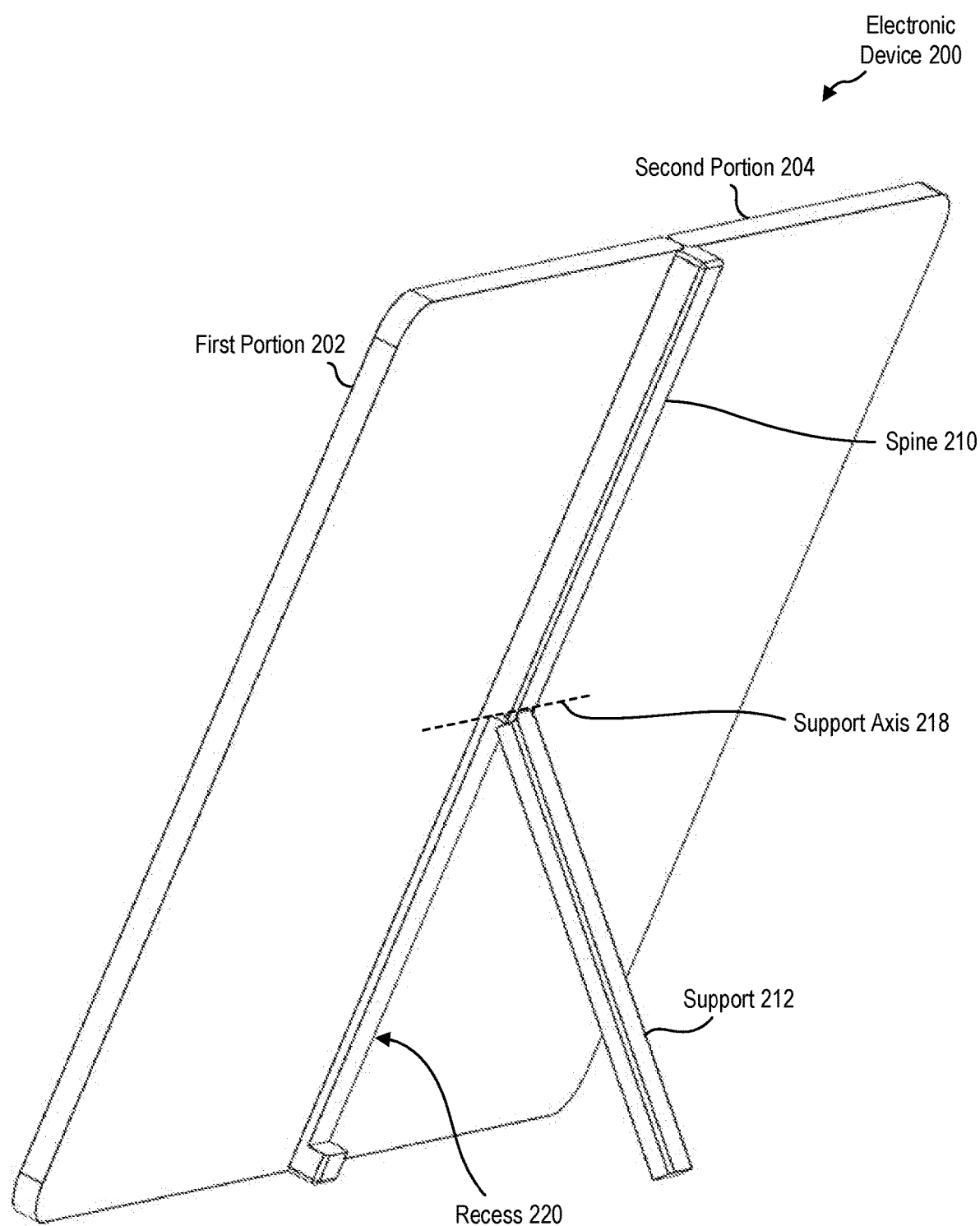
FIG. 3 is a rear perspective view of an electronic device with an integrated support, according to some embodiments of the present disclosure.

FIG. 3 is a perspective view of an electronic device 200 with a deployable support 212, according to at least some embodiments of the present disclosure. In some embodiments, the support 212 rotates from a support axis 218. In some embodiments, the support 212 deploys from a recess 220 in the spine 210, such that when the support 212 is in a stowed position abutting the spine 210, the support 212 is flush with the rest of the spine 210.

In some embodiments, the support 212 is locked in the recess 220 while the electronic device is in a closed position (e.g., as illustrated in FIG. 1). In some examples, the hinge 206 engages a pin or other locking mechanism that mechanically retains the support 212 in the stowed position in the recess 220. Locking the support 212 in the stowed position while the electronic device 200 is in a closed position can prevent damage to the support 212 and/or spine 210 during transportation and/or use.

In some embodiments, the support 212 is locked in the recess 212 when the electronic device 200 is in a closed position and only deployable when the first portion 202 and second portion 204 are in the open position an co-planar (e.g., oriented 180° from one another, as illustrated in FIG. 3). In some embodiments, the electronic device 200 and support 212 is stable in at least a three-point configuration when the first portion 202 and second portion 204 are in an open position and coplanar. Locking the support 212 in the stowed position while the electronic device 200 is not in an open position can prevent damage to the support 212 and/or spine 210 during transportation and/or use.

In some embodiments, a support is stable at a plurality of discrete positions. In some embodiments, the support is stable at a stowed position (e.g., a closed position in the spine or hinge) and at deployed positions that hold the display(s) at a 45° angle from horizontal and a 60° angle from horizontal. In some embodiments, a support is stable at any intermediate position from the stowed position to the deployed position at the end of the range of motion, such as a support including a friction hinge.

In some embodiments, the support is connected to the electronic device at a support axis. The support can rotate relative to the support axis to swing away from the first portion and second portion of the electronic device to hold the electronic device up. In some embodiments, a range of motion of the support around the support axis is in a range having an upper value, a lower value, or upper and lower values including any of 45°, 60°, 75°, 90°, 105°, 120°, 135°, 150°, 165°, 180° or any values therebetween. In some embodiments, the range of motion of the support is 180°. In some embodiments, the range of motion of the support is between 150° and 180°. In some embodiments, the range of motion of the support is less than 165°. In some embodiments, the range of motion of the support is between 45° and 180°.

The support has a length that is a percentage of a height of the electronic device. In some embodiments, the support has a length that is in a range having an upper value, a lower value, or upper and lower values including any of 30%, 40%, 50%, 60%, 70%, 80%, 90%, or any values therebetween of the height of the electronic device. In some embodiments, the support length is greater than 30% of the electronic device height. In some embodiments, the support length is less than 90% of the electronic device height. In some embodiments, the support length is between 30% and 90% of the electronic device height. In some embodiments, the support length is between 40% and 75% of the electronic device height. In some embodiments, the support length is about 50% of the electronic device height.

Figure 4:
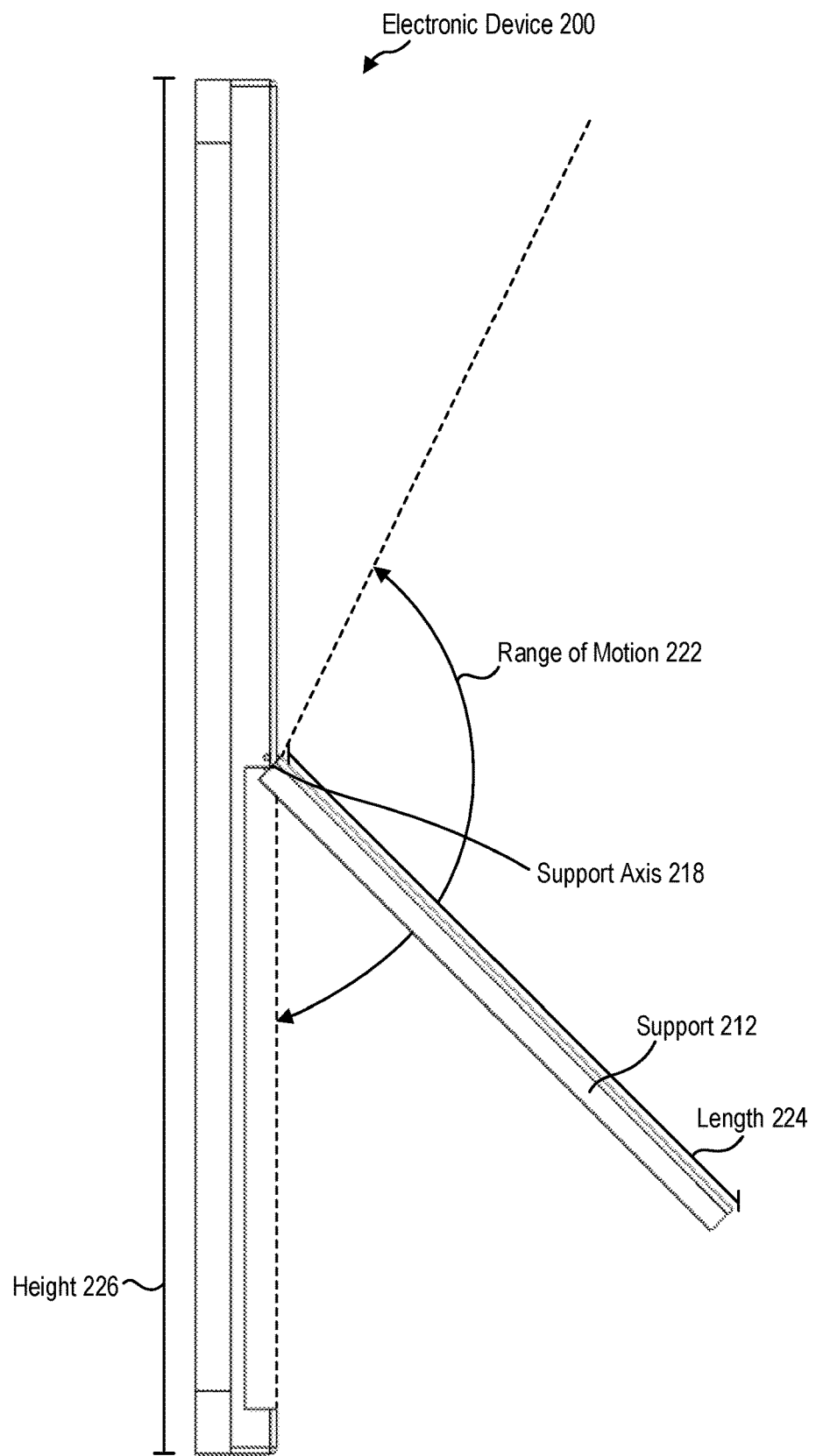
FIG. 4 is a side view of the electronic device of FIG. 3, according to some embodiments of the present disclosure.

FIG. 4 is a side view of the electronic device of FIG. 3, according to at least some embodiments of the present disclosure. The electronic device 200 has a support 212 that is rotatable around a support axis 218. In some embodiments, the support 212 has a range of motion 222 around the support axis 218 of 150°. In some embodiments, the support 212 is stable at any point therebetween, providing a continuously variable orientation of the electronic device on a surface.

In some embodiments, the support 212 has a length 224 that is related to the height 226 of the electronic device 200. In the embodiment illustrated in FIG. 4, the length 224 of the support 212 is approximately 50% of the height 226 of the electronic device 200.

In some embodiments, a support includes an upper section and lower section, where the upper section and lower section are hinged at a center axis. The upper section and lower section are movable relative to the spine and/or hinge to translate the center axis away from the spine and/or hinge. In some embodiments, a connection point of the lower section to the spine is slidable relative to the spine and towards the upper section, such that the center axis is urged outward and away from the spine. In some embodiments, a connection point of the upper section to the spine is slidable relative to the spine and towards the lower section, such that the center axis is urged outward and away from the spine. In some embodiments, both the connection point of the lower section to the spine is slidable relative to the spine and towards the upper section and the connection point of the upper section to the spine is slidable relative to the spine and towards the lower section, such that the center axis is urged outward and away from the spine.

Figure 5:
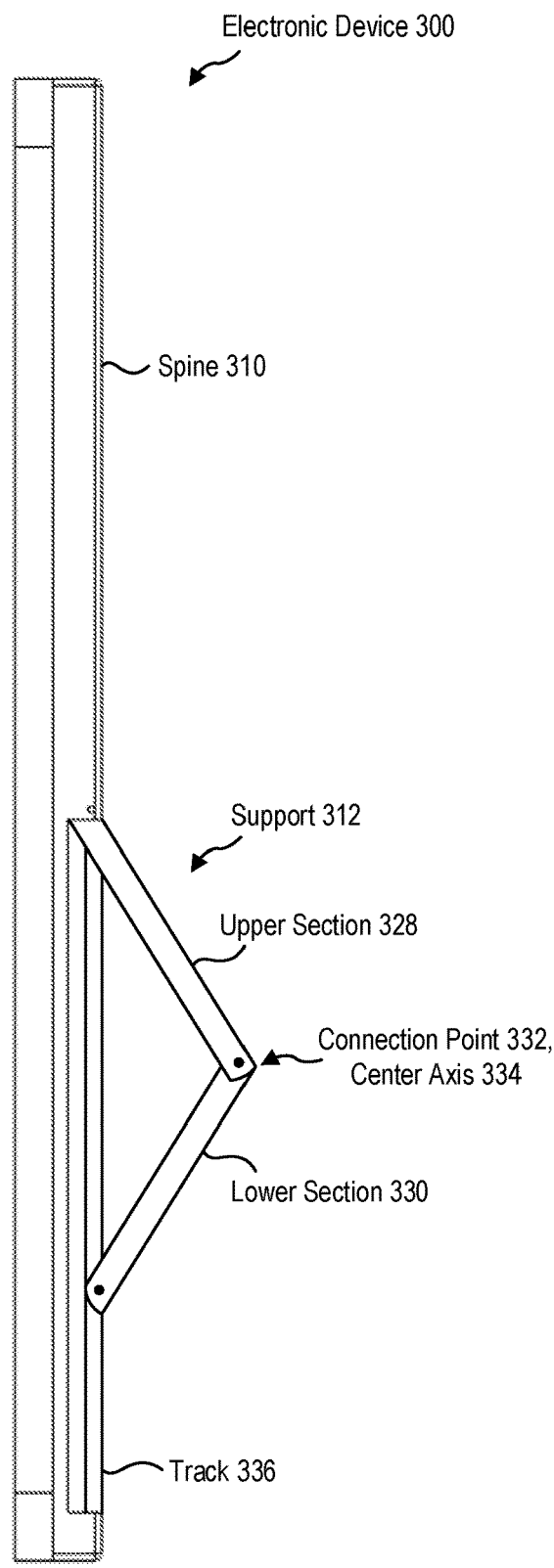
FIG. 5 is a side view of another electronic device with an integrated support, according to some embodiments of the present disclosure.

FIG. 5 is a side view of an electronic device 300 with a multi-linkage support 312, according to at least some embodiments of the present disclosure. In some embodiments, the support 312 has an upper section 328 and a lower section 330 that are connected to one another by a connection point 332. The connection point 332 allows the upper section 328 and lower section 330 to rotate relative to one another around a center axis 334. In some embodiments, the upper section 328 is rotatable (e.g., hinged) relative to the spine 310 and translationally fixed relative to the spine 310 while the lower section 328 can rotate and slide or translate relative to the spine 310. In some embodiments, a portion of the support 312 is slidable or translatable relative to the spine 310 within a track 336 affixed to or integrated into the spine 310.

In some embodiments, the upper section 328 is rotatable relative to the spine 310 and translatable relative to the spine 310 while the lower section 328 is rotatable but translationally fixed relative to the spine 310. In some embodiments, the upper section 328 is rotatable relative to the spine 310 and translatable relative to the spine 310 and the lower section 328 can rotate and translate relative to the spine 310.

While the support has been described herein as having a support axis at or near a vertical center of the spine, (e.g., the support extends like a leg from the spine of the electronic device), in some embodiments, the support is hinged at or near a bottom of the spine to fold out like a base portion. In some embodiments, the support holds the electronic device with the displays oriented at an angle greater than 30° from horizontal, greater than 45° from horizontal, greater than 60° from horizontal, or greater than 75° from horizontal.

Figure 6:
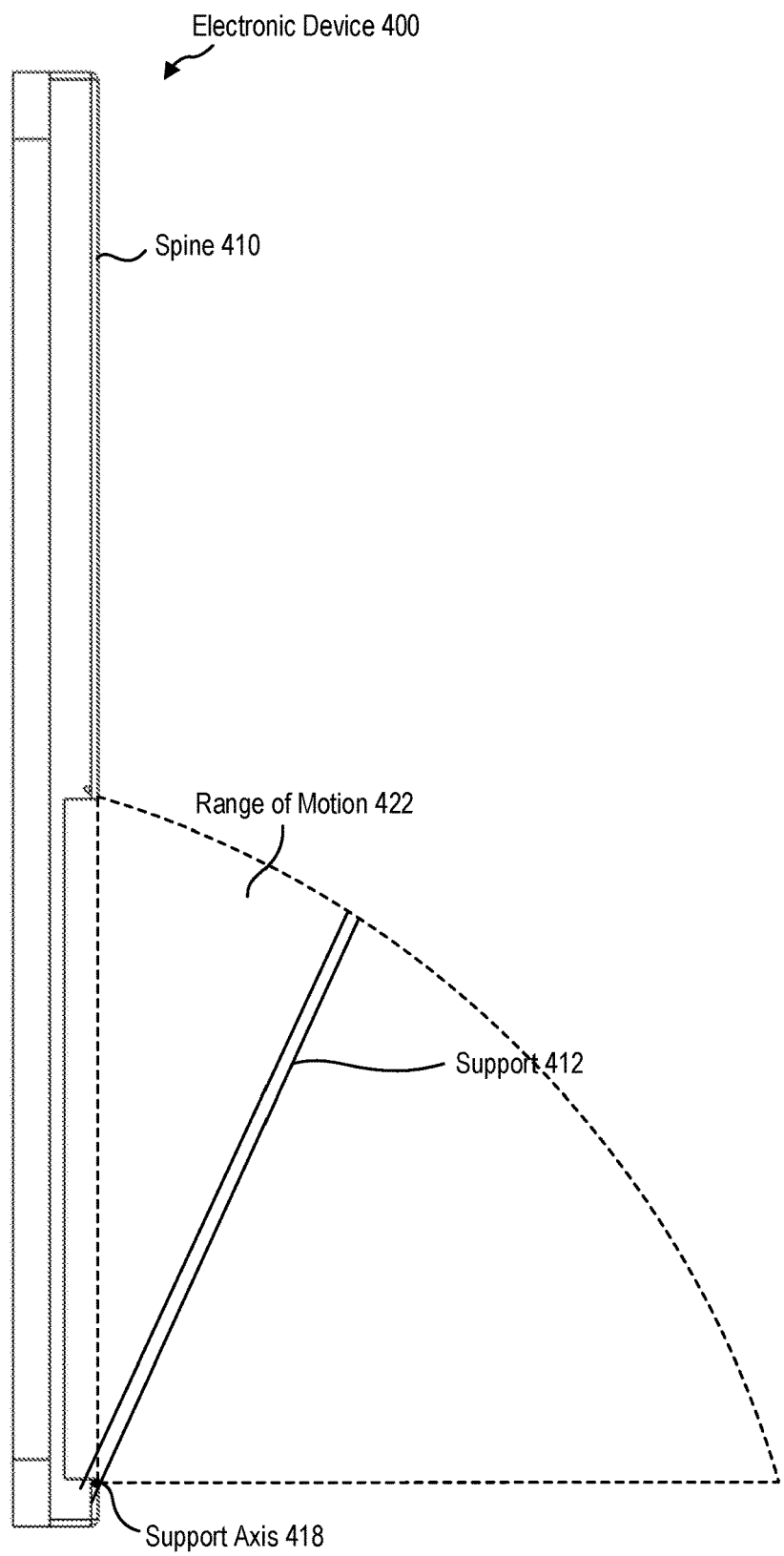
FIG. 6 is a side view of yet another electronic device with an integrated support, according to some embodiments of the present disclosure.

FIG. 6 is a side view of an electronic device 400, according to at least some embodiments of the present disclosure. In some embodiments, an electronic device 400 has a support 412 that is hinged near or at a bottom edge of the spine 410 and/or electronic device 400. In some embodiments, a support 412 hinged at the bottom of the spine 410 allows for a full range of orientations of the display(s) with a smaller necessary range of motion 422 of the support 412 around the support axis 418, when compared to a center-hinged support, such as described in relation to FIG. 4.

In some embodiments, a support according to the present disclosure is stable at a plurality of discrete positions. In some embodiments, the support is stable at a stowed position (e.g., a closed position in the spine or hinge) and at deployed positions that hold the display(s) at a 45° angle from horizontal and a 60° angle from horizontal. In some embodiments, a support is stable at any intermediate position from the stowed position to the deployed position at the end of the range of motion, such as a support including a friction hinge.

The spine can provide additional functionality beyond the support. In some embodiments, the spine contains a deployable support in a portion of the spine while another portion of the spine contains a dock for an accessory of the electronic device. In some embodiments, the spine contains a dock for a stylus. The stylus may be received in the dock within a portion of the spine. In other embodiments, the dock is a magnetic dock that magnetically attracts and retains the stylus or other accessory. In some embodiments, the dock includes one or more electrical contacts through which the electronic device charges the stylus or other accessory device. In some embodiments, the dock includes a wireless charging device, such as a magnetic coil or near-field communication coil, that allows the electronic device to charge the stylus wirelessly while docked.

Figure 7:
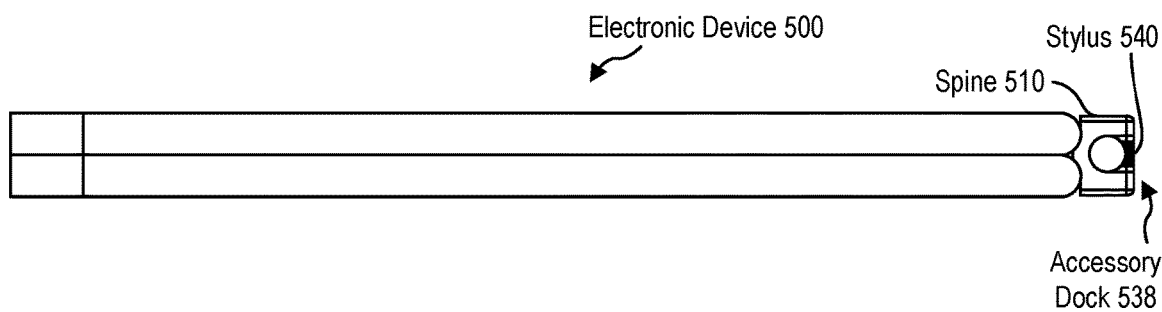
FIG. 7 is a top view of an electronic device with an integrated support with an accessory dock thereon, according to some embodiments of the present disclosure.

FIG. 7 is a top view of an electronic device 500 with an accessory dock positioned in the spine 510, according to at least some embodiments of the present disclosure. In some embodiments, the spine 510 has an accessory dock 538 positioned therein. In some embodiments, the spine 510 has an accessory dock 538 positioned on an exterior surface thereof. In some embodiments, the spine 510 can receive a stylus 540 or other accessory device within the spine 510 to store and/or protect the accessory device within the electronic device 500.

In some embodiments, the accessory dock 538 includes a retention mechanism, such as a clip, a pin, a magnet, or another device that holds the accessory device in or on the accessory dock 538. In some embodiments, the accessory dock 538 includes a charging device that can charge the accessory device, such as via electrical contacts which provide direct physical electrical communication with the accessory device or via a wireless charging mechanism, such as magnetic induction or optical charging.

In some embodiments, the spine and support are integrated with the hinge portion of the electronic device. A spine that is in line with the hinge axis (or axes) (e.g., positioned between two hinges) can embed the support between portions of the hinge to allow the electronic device to lie flat when the electronic device is in the open position with the first portion and second portion oriented at 180° from one another.

In some embodiments, an electronic device includes a plurality of supports positioned in the spine and/or hinge. In some embodiments, the supports open in opposite rotational directions to provide support to the device irrespective of orientation and/or with a smaller rotational range of motion of the supports. In such embodiments, a first support deploys by rotating around a first support axis to act as a leg and support the electronic device for viewing by a user. In order to move the display orientation to a low angle relative to horizontal (e.g., 20°), the first support would need to open to a large rotational angle around the first support axis, which may damage the first support or a connection between the first support and the electronic device.

To support the electronic device in such instances, the second support deploys by rotating around the second support axis. The second support can replicate the functionality and positioning of the first support opening to 135° by opening only to 45°. In some embodiments, limiting the rotational range or motion needed by the support axis can improve the strength of the supports and/or increase the operational lifetime of the supports.

Figure 8:
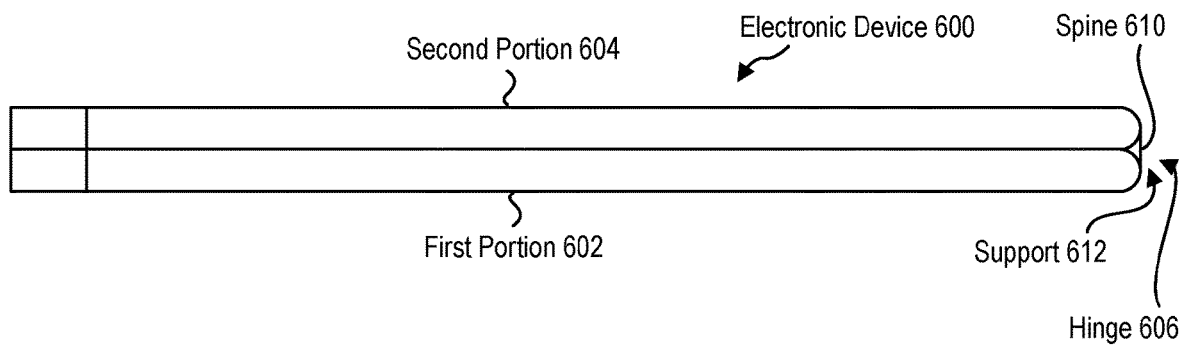
FIG. 8 is a top view of an electronic device with an integrated support positioned in line with the hinge axis, according to some embodiments of the present disclosure.

FIG. 8 is a top view of an electronic device 600 with a spine 610 and support 612 that are flush with a hinge 606, according to at least some embodiments of the present disclosure. The spine 610 is positioned in line with the hinge components of the hinge 606 of the electronic device 600. By positioning the spine 610 between the hinge components, the electronic device 600 can reach a full flat posture when in the open position and the first portion 602 and second portion 604 are coplanar. When lying flat in the open position, a spine 610 positioned between the hinge components does not introduce a fulcrum point from which the electronic device 600 rotates.

Figures 1, 9:
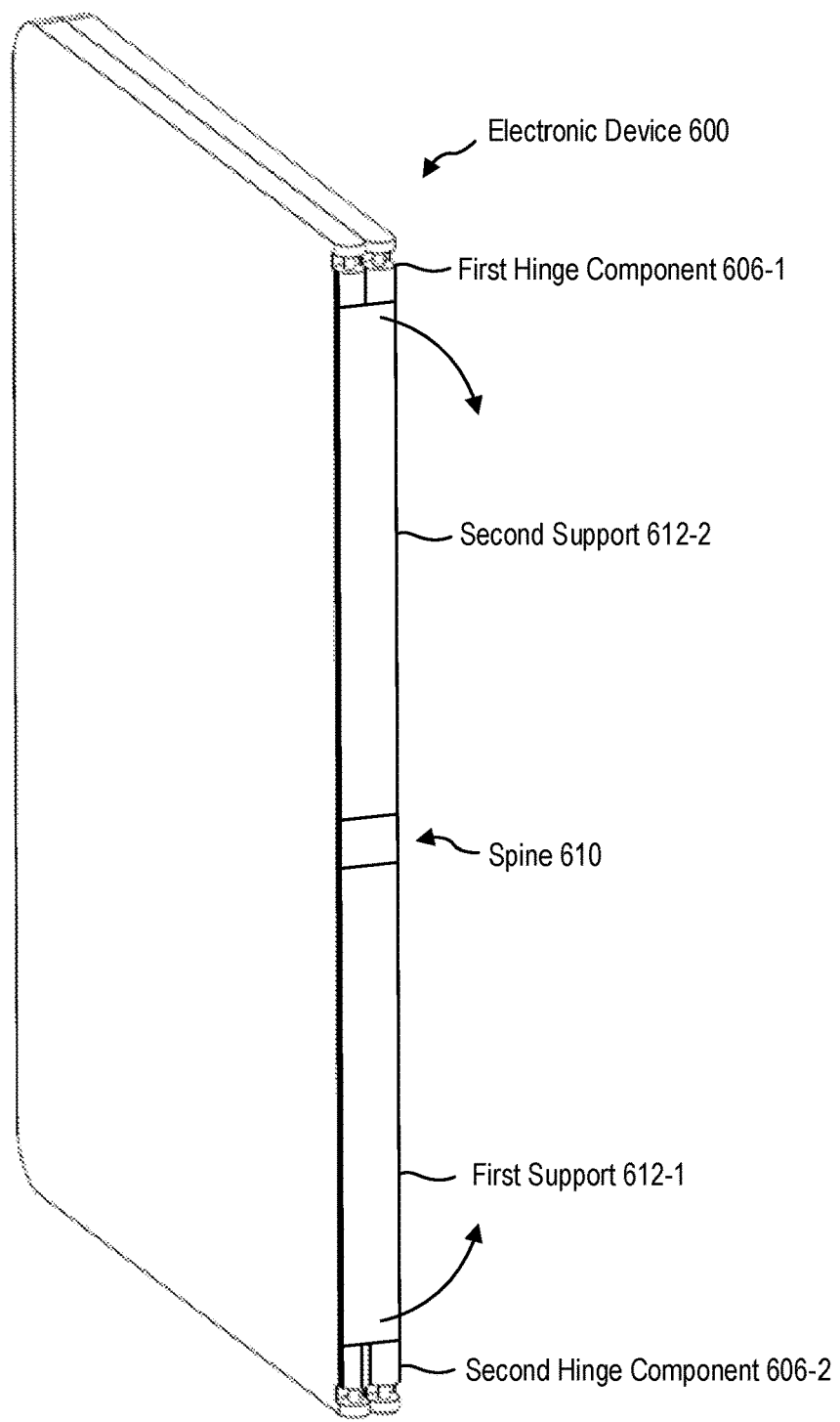
Figures 2, 9:
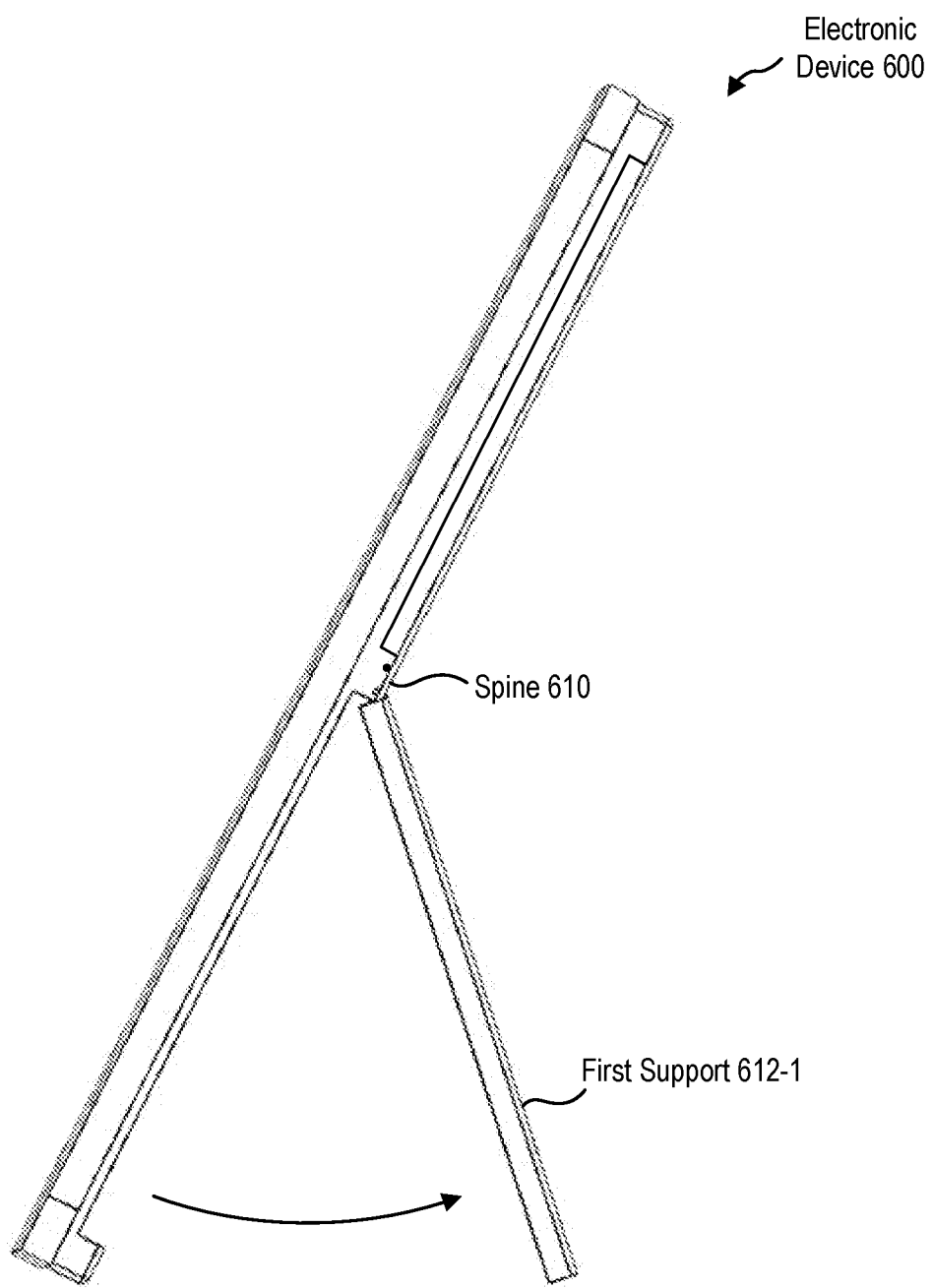
Figures 3, 9:
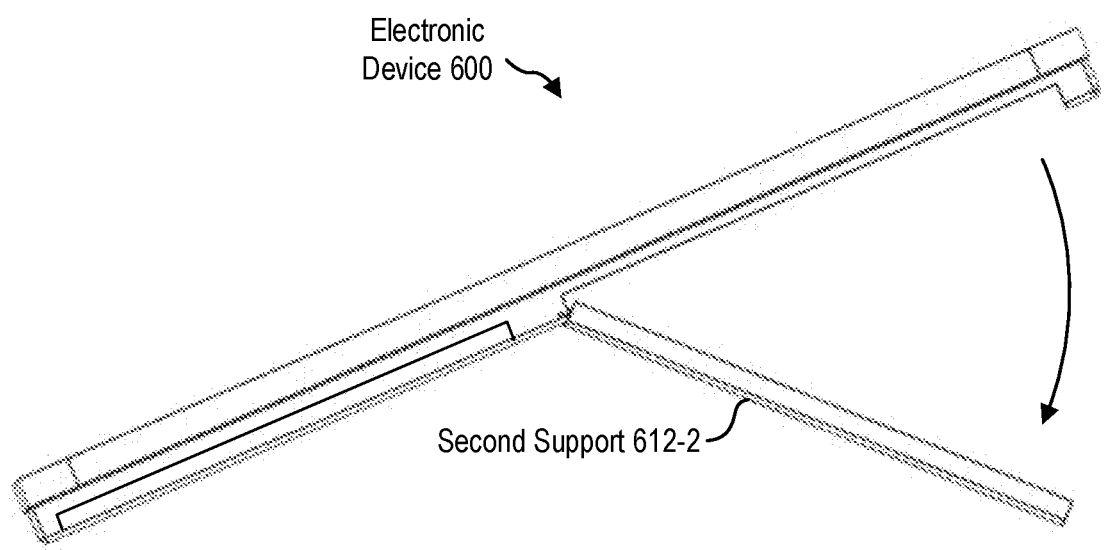

FIG. 9-1 is a perspective view of the electronic device of FIG. 8. The electronic device 600 has a first hinge component 606-1 positioned proximate a first end of the spine 610 and a second hinge component 606-2 positioned proximate an opposite, second end of the spine 610. In some embodiments, a spine 610 according to the present disclosure includes a plurality of supports 612-1, 612-2. In some embodiments, a first support 612-1 provides support for a first set of postures for the electronic device 600 while a second support 612-2 provides support for a second set of postures of the electronic device 600.

FIG. 9-2 is a side view of the electronic device 600 of FIG. 9-1. The first support 612-1 is deployable from the spine 610 to a deployed position or range of deployed positions. In some embodiments, the first support 612-1 in the deployed position(s) supports the electronic device 600 used in a variety of upright postures, such as when a user views the electronic device 600 while watching video or reading documents on the electronic device 600.

FIG. 9-3 is a side view of the electronic device 600 of FIG. 9-1. The second support 612-2 is deployable from the spine 610 to a deployed position or range of deployed positions. In some embodiments, the second support 612-2 in the deployed position(s) supports the electronic device 600 used in a variety of low-angle postures relative to the surface upon which the electronic device 600 rests, such as when a user uses the electronic device 600 for inking or other interaction with the touch-sensitive display.

INDUSTRIAL APPLICABILITY

The present disclosure relates generally to systems and methods for supporting an electronic device. More particularly, the present disclosure relates to supporting a foldable electronic device in a plurality of postures and on a variety of surfaces. In some embodiments, the foldable device has a closed position and an open position. In conventional laptop devices, the display is supported in the open posture by the base portion of the laptop device. In a book-style foldable electronic device, both portions of the electronic device may contain a display. The book-style foldable device can be oriented in a laptop posture in the open position and the first portion is supported by the second portion. However, in a book posture, with the hinge between the first portion and second portion oriented vertically, both portions are oriented vertically, and neither are able to function as a base portion.

In some embodiments, a foldable electronic device according to the present disclosure has an open position and a closed position. A first portion and a second portion of the electronic device are movable relative to one another around a hinge. In some embodiments, the hinge is a single-axis hinge. In other embodiments, the hinge is a multiple-axis hinge. For example, the hinge may have two or more parallel axes that each allow rotation of the first portion relative to the second portion.

The rotation of the first axis and the second axis may be independent of one another. In some examples, the rotation of the first axis and the second axis may be related. In some embodiments, the first axis and second axis rotate at the same rate, such that each axis is oriented at an equal angular position at point in the range of motion of the hinge. In some embodiments, the first axis and second axis rotate with determinate motion, allowing only one axis to move at a time.

In the closed position, and outer surface of the first portion and an outer surface of the second portion are oriented in opposite directions and form the outer surface of the electronic device. In some embodiments, the hinge connects the first portion and second portion and forms a spine, similar to the spine or binding of a conventional book, that runs a length of the electronic device. In some embodiments according to the present disclosure, a book-style electronic device has a deployable support in the spine.

In some embodiments, the electronic device has a first display on an inner surface of the first portion and a second display on an inner surface of the second portion. In some embodiments, the electronic device in the open position orients the first portion and the second portion at 180° relative to one another and positions the first display and the second display co-planar to one another. In this position, the first display and second display may be in data communication (e.g., through a processor and/or graphics module) that allows the first display and second display to present visual information to a user as if the first display and second display are a single, unified display area.

As a user may desire to view the visual information or interact with the visual information with the display upright, in some embodiments, a support is provided in the spine and/or hinge to support the electronic device substantially vertically upright and/or at an angle from upright similar to the display of a conventional laptop computer display. In some embodiments, the support holds the electronic device with the displays oriented at an angle greater than 30° from horizontal, greater than 45° from horizontal, greater than 60° from horizontal, or greater than 75° from horizontal.

In some embodiments, a support is stable at a plurality of discrete positions. In some embodiments, the support is stable at a stowed position (e.g., a closed position in the spine or hinge) and at deployed positions that hold the display(s) at a 45° angle from horizontal and a 60° angle from horizontal. In some embodiments, a support is stable at any intermediate position from the stowed position to the deployed position at the end of the range of motion, such as a support including a friction hinge.

In some embodiments, the support is connected to the electronic device at a support axis. The support can rotate relative to the support axis to swing away from the first portion and second portion of the electronic device to hold the electronic device up. In some embodiments, a range of motion of the support around the support axis is in a range having an upper value, a lower value, or upper and lower values including any of 45°, 60°, 75°, 90°, 105°, 120°, 135°, 150°, 165°, 180° or any values therebetween. In some embodiments, the range of motion of the support is 180°. In some embodiments, the range of motion of the support is between 150° and 180°. In some embodiments, the range of motion of the support is less than 165°. In some embodiments, the range of motion of the support is between 45° and 180°.

The support has a length that is a percentage of a height of the electronic device. In some embodiments, the support has a length that is in a range having an upper value, a lower value, or upper and lower values including any of 30%, 40%, 50%, 60%, 70%, 80%, 90%, or any values therebetween of the height of the electronic device. In some embodiments, the support length is greater than 30% of the electronic device height. In some embodiments, the support length is less than 90% of the electronic device height. In some embodiments, the support length is between 30% and 90% of the electronic device height. In some embodiments, the support length is between 40% and 75% of the electronic device height. In some embodiments, the support length is about 50% of the electronic device height.

In some embodiments, a support includes an upper section and lower section, where the upper section and lower section are hinged at a center axis. The upper section and lower section are movable relative to the spine and/or hinge to translate the center axis away from the spine and/or hinge. In some embodiments, a connection point of the lower section to the spine is slidable relative to the spine and towards the upper section, such that the center axis is urged outward and away from the spine. In some embodiments, a connection point of the upper section to the spine is slidable relative to the spine and towards the lower section, such that the center axis is urged outward and away from the spine. In some embodiments, both the connection point of the lower section to the spine is slidable relative to the spine and towards the upper section and the connection point of the upper section to the spine is slidable relative to the spine and towards the lower section, such that the center axis is urged outward and away from the spine.

While the support has been described herein as having a support axis at or near a vertical center of the spine, (e.g., the support extends like a leg from the spine of the electronic device), in some embodiments, the support is hinged at or near a bottom of the spine to fold out like a base portion. In some embodiments, the support holds the electronic device with the displays oriented at an angle greater than 30° from horizontal, greater than 45° from horizontal, greater than 60° from horizontal, or greater than 75° from horizontal.

In some embodiments, a support is stable at a plurality of discrete positions. In some embodiments, the support is stable at a stowed position (e.g., a closed position in the spine or hinge) and at deployed positions that hold the display(s) at a 45° angle from horizontal and a 60° angle from horizontal. In some embodiments, a support is stable at any intermediate position from the stowed position to the deployed position at the end of the range of motion, such as a support including a friction hinge.

The spine can provide additional functionality beyond the support. In some embodiments, the spine contains a deployable support in a portion of the spine while another portion of the spine contains a dock for an accessory of the electronic device. In some embodiments, the spine contains a dock for a stylus. The stylus may be received in the dock within a portion of the spine. In other embodiments, the dock is a magnetic dock that magnetically attracts and retains the stylus or other accessory. In some embodiments, the dock includes one or more electrical contacts through which the electronic device charges the stylus or other accessory device. In some embodiments, the dock includes a wireless charging device, such as a magnetic coil or near-field communication coil, that allows the electronic device to charge the stylus wirelessly while docked.

In some embodiments, the spine and support are integrated with the hinge portion of the electronic device. A support that is in line with the hinge axis (or axes) can embed the support between portions of the hinge to allow the electronic device to lie flat when the electronic device is in the open position with the first portion and second portion oriented at 180° from one another.

In some embodiments, an electronic device includes a plurality of supports positioned in the spine and/or hinge. In some embodiments, the supports open in opposite rotational directions to provide support to the device irrespective of orientation and/or with a smaller rotational range of motion of the supports. In such embodiments, a first support deploys by rotating around a first support axis to act as a leg and support the electronic device for viewing by a user. In order to move the display orientation to a low angle relative to horizontal (e.g., 20°), the first support would need to open to a large rotational angle around the first support axis, which may damage the first support or a connection between the first support and the electronic device.

To support the electronic device in such instances, the second support deploys by rotating around the second support axis. The second support can replicate the functionality and positioning of the first support opening to 135° by opening only to 45°. In some embodiments, limiting the rotational range or motion needed by the support axis can improve the strength of the supports and/or increase the operational lifetime of the supports.

The present disclosure relates to systems and methods for supporting an electronic device on a surface according to at least the examples provided in the sections below:

1. An electronic device comprising:
    a first portion (e.g., first portion 102, FIG. 1-2; first portion 202, FIG. 3-4);
    a second portion (e.g., second portion 104, FIG. 1-2; second portion 204, FIG. 3-4) movably connected to the first portion by a hinge (e.g., hinge 106, FIG. 1; hinge 606, FIG. 8), the hinge having a hinge axis (e.g., hinge axis 108-1, 108-2, FIG. 1);
    a spine (e.g., spine 110, FIG. 1-2; spine 210, FIG. 3; spine 310, FIG. 5; spine 410, FIG. 6; spine 510, FIG. 7; spine 610, FIG. 8-9-2) oriented parallel to the hinge axis; and
    a support (e.g., support 112, FIG. 1; support 212, FIG. 3-4; support 312, FIG. 5; support 412, FIG. 6; first support 612-1, FIG. 9-1, 9-2; second support 612-1, FIG. 9-1, 9-3) connected to the spine and having a deployed position and a stowed position, the stowed position abutting the spine and the deployed position spaced apart from the spine to support the electronic device on a surface.
2. The electronic device of section 1, wherein the first portion includes a first display (e.g., first display 114, FIG. 2) and second portion includes a second display (e.g., second display 116, FIG. 2).
3. The electronic device of sections 1 or 2, wherein the support is rotatable relative to the spine around a support axis (e.g., support axis 218, FIG. 3-4).
4. The electronic device of any preceding section, wherein the support has a length (e.g., length 224, FIG. 4) that is at least 30% of a height (e.g., height 226, FIG. 4) of the electronic device.
5. The electronic device of any preceding section, wherein the support includes a first section (e.g., upper section 328, FIG. 5) and a second section (e.g., lower section 330, FIG. 5), the first section being rotatably connected (e.g., connection point 332, FIG. 5) to the second section.

6. The electronic device of section 5, wherein the second section is slidably connected to the spine.

7. The electronic device of section 5, wherein the first section is slidably connected to the spine.

8. The electronic device of section 1, wherein the spine further includes an accessory dock (e.g., accessory dock 538, FIG. 7).

9. The electronic device of section 8, wherein the accessory dock includes a charging device to charge an accessory device.

10. The electronic device of section 9, wherein the charging device is a wireless charging device.

11. The electronic device of section 8, wherein the accessory dock includes a retention mechanism to retain an accessory device (e.g., stylus 540, FIG. 7) in the accessory dock.

12. The electronic device of section 8, wherein the accessory dock is positioned within the spine to receive an accessory device at least partially within the spine.

13. The electronic device of any preceding section, wherein the support is stable at a plurality of discrete angular positions around the support axis.

14. The electronic device of any preceding section, wherein the support is connected to the spine by a friction hinge, the friction hinge allowing the support to hold the electronic device at any position within the range of motion of the support relative to the spine.

15. The electronic device of any preceding section wherein the first portion and second portion have a closed position in which the first portion and second portion are positioned with an inner surface of the first portion adjacent an inner surface of the second portion, and the support is locked in a stowed position when the first portion and second portion are in the closed position.

16. The electronic device of any preceding section, wherein the first portion and second portion have an open position in which the first portion and second portion are positioned with an inner surface of the first portion co-planar with an inner surface of the second portion, and the support is unlocked and deployable only when the first portion and second portion are in the open position.

17. The electronic device of any preceding section, further comprising a second support connected to the spine and deployable from the spine independently of the support.

18. An electronic device comprising a first portion (e.g., first portion 102, FIG. 1-2; first portion 202, FIG. 3-4);

a second portion (e.g., second portion 104, FIG. 1-2; second portion 204, FIG. 3-4) movably connected to the first portion by a hinge (e.g., hinge 106, FIG. 1; hinge 606, FIG. 8), the hinge having a first hinge component (e.g., first hinge component 606-1, FIG. 9-1) and a second hinge component (e.g., second hinge component 606-2, FIG. 9-1) and the hinge having a hinge axis (e.g., hinge axis 108-1, 108-2, FIG. 1);

a spine (e.g., spine 610, FIG. 8-9-2) positioned between the first hinge component and the second hinge component; and a support (e.g., support 112, FIG. 1; support 212, FIG. 3-4; support 312, FIG. 5; support 412, FIG. 6; first support 612-1, FIG. 9-1, 9-2; second support 612-1, FIG. 9-1, 9-3) connected to the spine and having a deployed position and a stowed position, the stowed position abutting the spine and the deployed position spaced apart from the spine to support the electronic device on a surface.

19. The electronic device of section 18, wherein:

the electronic device has an open position with the first portion and second portion oriented at 180° and coplanar, and wherein the support has a stowed position in the spine and the spine and support are flush with the first portion and second portion when the support is in the stowed position and the electronic device is in the open position.

20. An electronic device comprising a first portion (e.g., first portion 102, FIG. 1-2; first portion 202, FIG. 3-4) having a first display (e.g., first display 114, FIG. 2) positioned on an inner surface;

a second portion (e.g., second portion 104, FIG. 1-2; second portion 204, FIG. 3-4) movably connected to the first portion by a hinge (e.g., hinge 106, FIG. 1; hinge 606, FIG. 8), the second portion having a second display (e.g., second display 116, FIG. 2) positioned on an inner surface, where the first display and second display are proximate and oriented toward one another in a closed position and coplanar in an open position, the hinge having a hinge axis (e.g., hinge axis 108-1, 108-2, FIG. 1);

a spine (e.g., spine 110, FIG. 1-2; spine 210, FIG. 3; spine 310, FIG. 5; spine 410, FIG. 6; spine 510, FIG. 7; spine 610, FIG. 8-9-2) positioned parallel to the hinge axis; and a support (e.g., support 112, FIG. 1; support 212, FIG. 3-4; support 312, FIG. 5; support 412, FIG. 6; first support 612-1, FIG. 9-1, 9-2; second support 612-1, FIG. 9-1, 9-3) connected to the spine at a support axis (e.g., support axis 218, FIG. 3-4) and having a deployed position and a stowed position, the stowed position abutting the spine and the deployed position rotated around the support axis with a portion of the support spaced apart from the spine to support the electronic device on a surface.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. An electronic device comprising:
   a first portion;
   a second portion movably connected to the first portion by a hinge, the hinge having a hinge axis and forming a spine that runs a length of the electronic device; and
   a support in the spine and having a deployed position and a stowed position, the stowed position abutting the spine and the deployed position spaced apart from the spine to support the electronic device on a surface,
   wherein the support includes a first section having a first higher end and a first lower end and a second section having a second higher end and a second lower end, the first lower end of the first section being rotatably connected to the second higher end of the second section by a connection point and configured to protrude away from the spine when in the deployed position, wherein the second lower end of the second section is slidably connected to the spine and the first higher end of the first section is translationally fixed relative to the spine; and
   wherein the first portion includes a first display and the second portion includes a second display.

2. The electronic device of claim 1, wherein the support is rotatable relative to the spine around a support axis.

3. The electronic device of claim 1, wherein the spine further includes an accessory dock.

4. The electronic device of claim 3, wherein the accessory dock includes a charging device to charge an accessory device.

5. The electronic device of claim 4, wherein the charging device is a wireless charging device.

6. The electronic device of claim 3, wherein the accessory dock includes a retention mechanism to retain an accessory device in the accessory dock.

7. The electronic device of claim 3, wherein the accessory dock is positioned within the spine to receive an accessory device at least partially within the spine.

8. The electronic device of claim 1, wherein the support is stable at a plurality of discrete angular positions around the support axis.

9. The electronic device of claim 1, wherein the support is connected to the spine by a friction hinge, the friction hinge allowing the support to hold the electronic device at any position within the range of motion of the support relative to the spine.

10. The electronic device of claim 1, wherein the hinge has a first hinge component and a second hinge component that define the hinge axis, and the spine is positioned between the first hinge component and the second hinge component.

11. The electronic device of claim 1, wherein the support is locked in a recess while the electronic device is in the stowed position.

12. The electronic device of claim 1, wherein the spine further includes an accessory dock.

13. The electronic device of claim 12, wherein the support is stable at a plurality of discrete angular positions around the support axis.

14. The electronic device of claim 13, wherein the support is connected to the spine by a friction hinge, the friction hinge allowing the support to hold the electronic device at any position within the range of motion of the support relative to the spine.

15. The electronic device of claim 14, wherein the hinge has a first hinge component and a second hinge component that define the hinge axis, and the spine is positioned between the first hinge component and the second hinge component.

16. The electronic device of claim 15, wherein the support is locked in a recess while the electronic device is in the stowed position.

17. The electronic device of claim 1, wherein the support has a length that is less than 70% of the length of the electronic device.

18. The electronic device of claim 1, wherein the support is stable at a plurality of discrete angular positions around the support axis.

* * * * *